United States Patent [19]

Hirst

[11] Patent Number: 5,491,540
[45] Date of Patent: Feb. 13, 1996

[54] REPLACEMENT PART WITH INTEGRAL MEMORY FOR USAGE AND CALIBRATION DATA

[75] Inventor: B. Mark Hirst, Boise, Id.

[73] Assignee: Hewlett-Packard Company, Palo Alto, Calif.

[21] Appl. No.: 363,188

[22] Filed: Dec. 22, 1994

[51] Int. Cl.⁶ .................................................. G03G 15/00
[52] U.S. Cl. .......................... 355/200; 355/203; 355/208; 355/210; 355/246; 355/260; 355/284
[58] Field of Search ...................................... 355/200, 203, 355/204, 207, 208, 210, 246, 282, 284, 260, 251, 206; 364/550, 525

[56] References Cited

U.S. PATENT DOCUMENTS

| | | | |
|---|---|---|---|
| 4,961,088 | 10/1990 | Gilliland et al. | 355/206 |
| 5,016,171 | 5/1991 | Connolly et al. | 364/406 |
| 5,049,898 | 9/1991 | Arthur et al. | 346/1.1 |
| 5,066,978 | 11/1991 | Watarai et al. | 355/206 |
| 5,206,685 | 4/1993 | Hara et al. | 355/206 |
| 5,218,407 | 6/1993 | Matsushita et al. | 355/246 X |
| 5,272,503 | 12/1993 | LeSueur et al. | 355/208 |
| 5,283,613 | 2/1994 | Midgley, Sr. | 355/203 |
| 5,365,312 | 11/1994 | Hillmann et al. | 355/206 |
| 5,452,059 | 9/1995 | Sekiya | 355/210 |

*Primary Examiner*—Mathew S. Smith

[57] ABSTRACT

A printer/copier apparatus is adapted to receive replacement parts that are subject to wear or which comprise a consumable that is employed during the printing/copying operation. The apparatus includes a first connector that is coupled to a processor which controls operation of the apparatus. A replaceable part includes a second connector which mates with the first connector. The replaceable part includes a serial access memory that is connected to the second connector by only a single wire. Data transfers are enabled both from and to the serial access memory to allow storage of data that is indicative of usage, calibration, or other data relating to the replaceable part. Usage of the single wire memory enables direct substitution of the serial access memory in place of a presently provided fuse, without requiring changes to the physical interface between the replaceable part and the connectors which enable mating of the replaceable part with the apparatus.

7 Claims, 3 Drawing Sheets

REPLACEMENT PART WITH INTEGRAL MEMORY FOR USAGE AND CALIBRATION DATA

FIELD OF THE INVENTION

This invention relates to apparatus that employs replaceable, consumable, parts and supplies and, more particularly, to replaceable, consumable parts and supplies that include integral memory for storing both usage and calibration data.

BACKGROUND OF THE INVENTION

Substantially all present-day copiers, printers, plotters, etc. include a controlling microprocessor which requires input calibration data for internal components so as to enable high quality production of documents. Since most such apparatus is produced so as to allow user-replacement of consumable items, entry of usage and calibration data must be performed by the user (or repair-person) who is performing the replacement operation. Any error in entry of calibration data can substantially degrade the apparatus or render the apparatus inoperative.

To determine usage of consumables, the prior art has generally been restricted to simple record-keeping entries which enable the user to know when replacement is required. For instance, copiers often display a count of the number of output pages and maintain an internal record of the number of rotations of the drum (or of an organic photoconductor web) to enable the processor to signal when service or replacement is required.

Replaceable developer modules are currently employed in many electrophotographic printers and copiers. Each developer module includes a supply of toner and toner carrier along with a mechanism to bring the toner/carrier mixture to a drum (or web) surface. To provide proper control signal levels for a laser exposure system, the control microprocessor adjusts the ratio of toner to carrier so as to achieve a proper mixture. One method for controlling the toner-to-carrier ratio is to provide an oscillator circuit whose frequency is varied by the toner-to-carrier ratio. Upon an initial installation of a new developer module, the control processor takes a number of minutes to accumulate sufficient data from the oscillator circuit to determine the toner-to-carrier ratio so as to enable a setting of the proper signal levels in the laser exposure system. If the developer module is removed from the apparatus or is transferred to another apparatus, the entire calibration procedure must be repeated.

While, as above indicated, printers and copiers have heretofore retained an output page count, such a raw page count does not take into account different wear levels created by different media types. For instance, a fuser assembly (which includes a pair of platen rollers, one or both being heated) manifests a surface breakdown phenomenon after approximately 80,000 pages of a standard media type. Different media types cause a variation in fuser assembly wear and a simple page count does account for such variations.

Fuser assemblies used with color printers employ a silicone oil to increase color saturation level and to provide a glossy finish to printed media sheets. Different media types require variations in the amount of applied oil. A control system is provided to enable the fuser assembly to know the particular type of media sheet so as to enable a determination of the amount of oil to be deposited. While the processor maintains track of cumulative oil usage, if the fuser assembly is removed or the stored data regarding oil usage is lost, there is no way to reconstruct the usage state of the fuser assembly when it is put back into service.

In a similar fashion, an electrophotographic drum includes a photosensitive layer that manifests a determined charge sensitivity. Such charge sensitivity data is employed as a control parameter in the power control loop of the laser exposure system. Heretofore, such charge sensitivity data has been entered by the operator. If, however, the drum is transferred between printers, as may happen during servicing, such data does not travel with the drum but must be reentered.

U.S. Pat. No. 5,049,898 to Arthur et al., assigned to the same assignee as this application, discloses a disposable printing assembly wherein an integral memory element stores data that characterizes the assembly. Arthur et al. provide an ink jet print head assembly with a memory which designates the color of ink in the print head, its amount, and the position of the ink jet orifice plate on the print head body. This data is read from the print head by a read/write element in the printer and is then used or displayed, as desired.

Many consumable, replacement parts for printers/copiers include a fuse that is integral to the replacement part and identifies whether the replacement part is new or used. If, upon insertion of the replacement part, the controlling microprocessor determines that the fuse is intact, the machine determines that the replacement part is new and zeros out its count values which indicate the remaining usable life for the part. When further input data concerning the replacement part is required, the microprocessor either indicates the need for such data to the user via a control panel or automatically gathers the data from a replacement part sensor (as in the case of the toner-to-carrier ratio in a developer module). Thereafter, the fuse is blown.

Such a prior art circuit is shown in FIG. 1 for an electrophotographic printer wherein each of a plurality of consumable parts are plug connected to a printer at an interface 10. The plug-connected consumable items include an oil pad module 12, a black (K) toner developer module 14, a color developer module 16, a fuser assembly 18, a transfer assembly 20, and a photographic drum assembly 22. Those skilled in the art will realize that there are other additional consumable items which can also be plug connected to a printer, in addition to the aforementioned consumable parts. Each consumable item includes a fuse 24 that is blown by fuse blow circuitry module 26 upon completion of a calibration action by control computer 28. Fuse 24 is incorporated into the structure of each of the replacement items and is connected via a single wire to a contact 30 in a multiple contact connector, which interfaces with a connector in the printer. A ground connection 32 within the replacement item enables a complete circuit to be made through fuse 24.

It is an object of this invention to provide a replaceable part/consumable with an integral memory that enables both usage and calibration data to be stored and altered.

It is another object of this invention to provide a replaceable part/consumable with a memory module that requires no modification to a preexisting physical interface between the part/consumable and apparatus in which the part/consumable is placed.

SUMMARY OF THE INVENTION

A printer/copier apparatus is adapted to receive replacement parts that are subject to wear or which comprise a consumable that is employed during the printing/copying operation. The apparatus includes a first connector that is coupled to a processor/memory combination which controls operation of the apparatus. A replaceable part includes a second connector which mates with the first connector. The replaceable part includes a serial access memory that is connected to the second connector by only a single wire. Data transfers are enabled both from and to the serial access memory to allow storage of data that is indicative of usage, calibration, or other data relating to the replaceable part. Usage of the single wire enables direct substitution of the serial access memory in place of a presently provided fuse, without requiring changes to the physical interface between the replaceable part and the connectors which mate the replaceable part with the apparatus.

DETAILED DESCRIPTION OF THE INVENTION

Hereafter, the invention will be described in the context of an electrophotographic printer, however it is to be understood that the invention is applicable to any computer-controlled apparatus that includes replaceable parts/consumables.

As will be understood, the invention enables usage and calibration data to be stored in a single wire memory module that is incorporated into a replaceable part. Thus, if the replaceable part is transferred from first apparatus to second apparatus, the second apparatus is enabled to adjust its control parameters in accordance with the data stored in the part's on-board memory. This is critical when data from the replaceable part must be interrelated with other data to enable derivation of apparatus control signals. For instance, humidity data that is internally sensed within a printer, when combined with a photoconductor's sensitivity data, directly influences the laser's exposure settings. If incorrect photoconductor sensitivity data is utilized, printer performance is adversely affected.

Recently, single wire access, serial memories have become available in the marketplace. One such memory family comprises the DS1992-DS1995 Touch Memories from Dallas Semi-Conductors Inc. Each of those memories is configured as a nonvolatile, random-access memory with storage sizes which range from 1K–16K bytes. In the case of the DS1992, the internal 128 bytes of nonvolatile RAM are organized as four storage areas of 32 bytes each and a scratch pad of 32 bytes. Data input and output from the one wire memory is accomplished via a protocol wherein various length pulses are employed which evidence the beginning of a read/write action. Those pulses are followed by bit-by-bit transfers, wherein ones and zeros are manifest by different pulse lengths.

Figure 1:
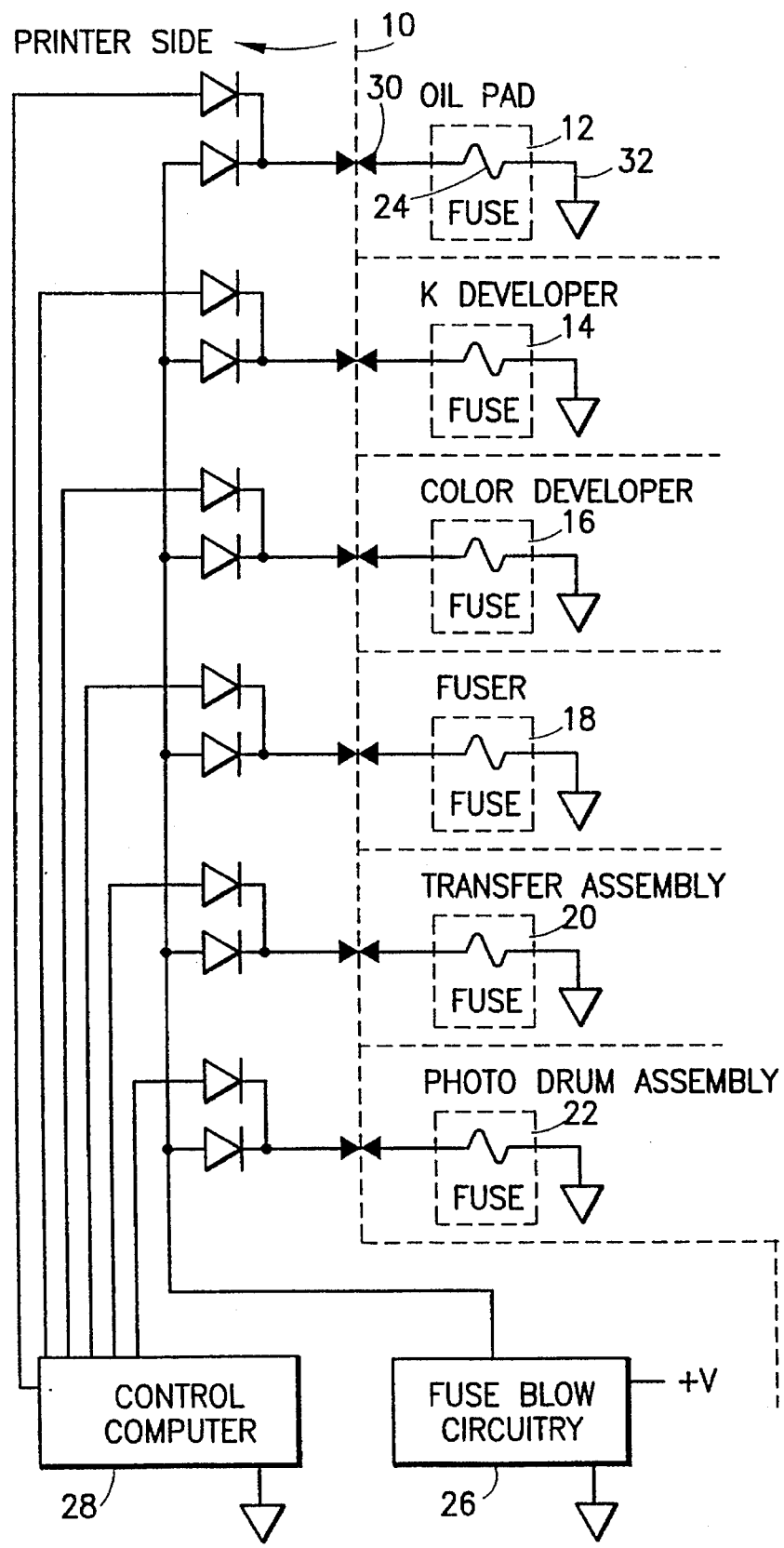
FIG. 1 is a block diagram of a prior art apparatus wherein each replaceable part includes an integral fuse that is wired to an interface connector via a single wire.
Figure 2:
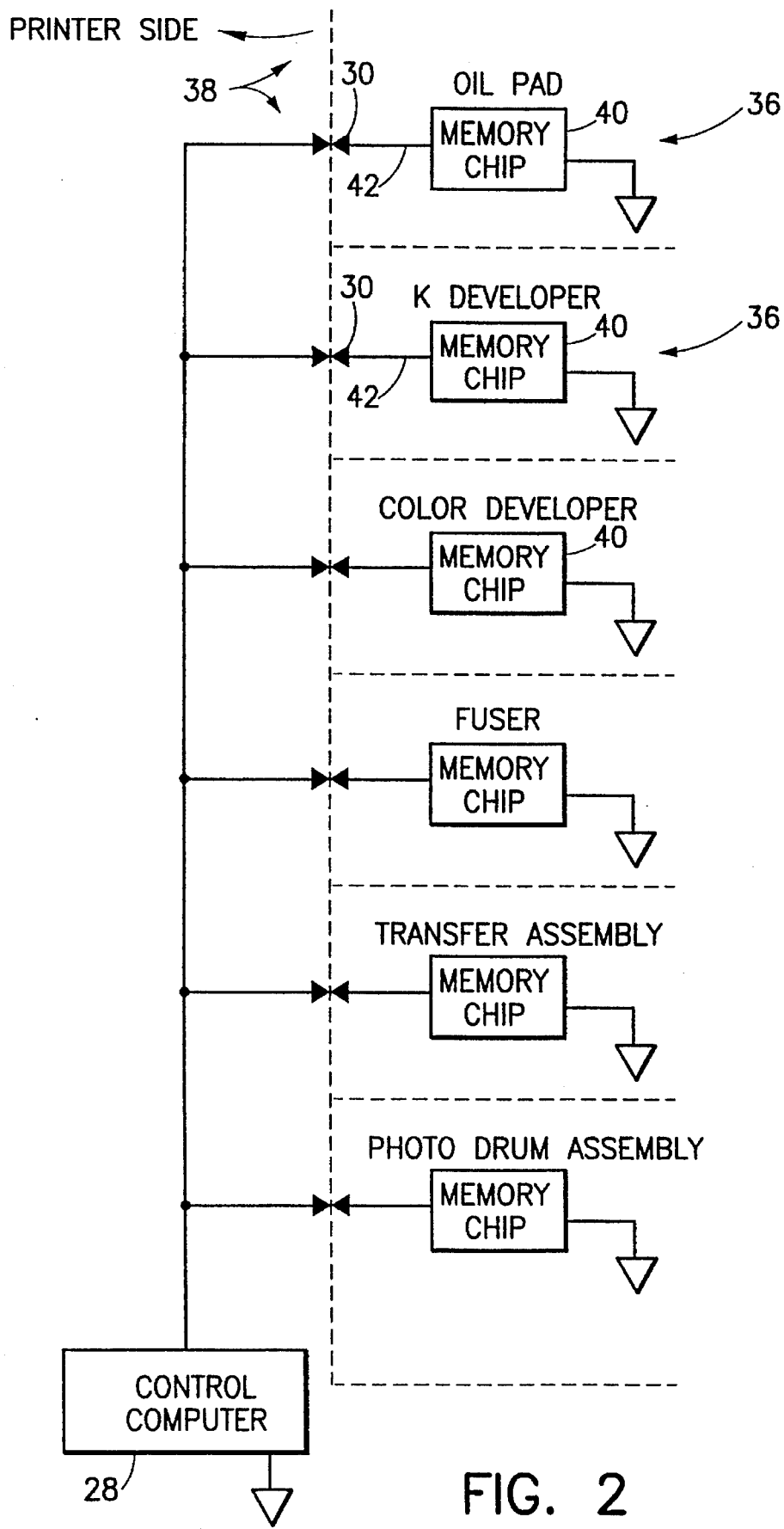
FIG. 2 is a block diagram that illustrates the invention.
Figure 3:
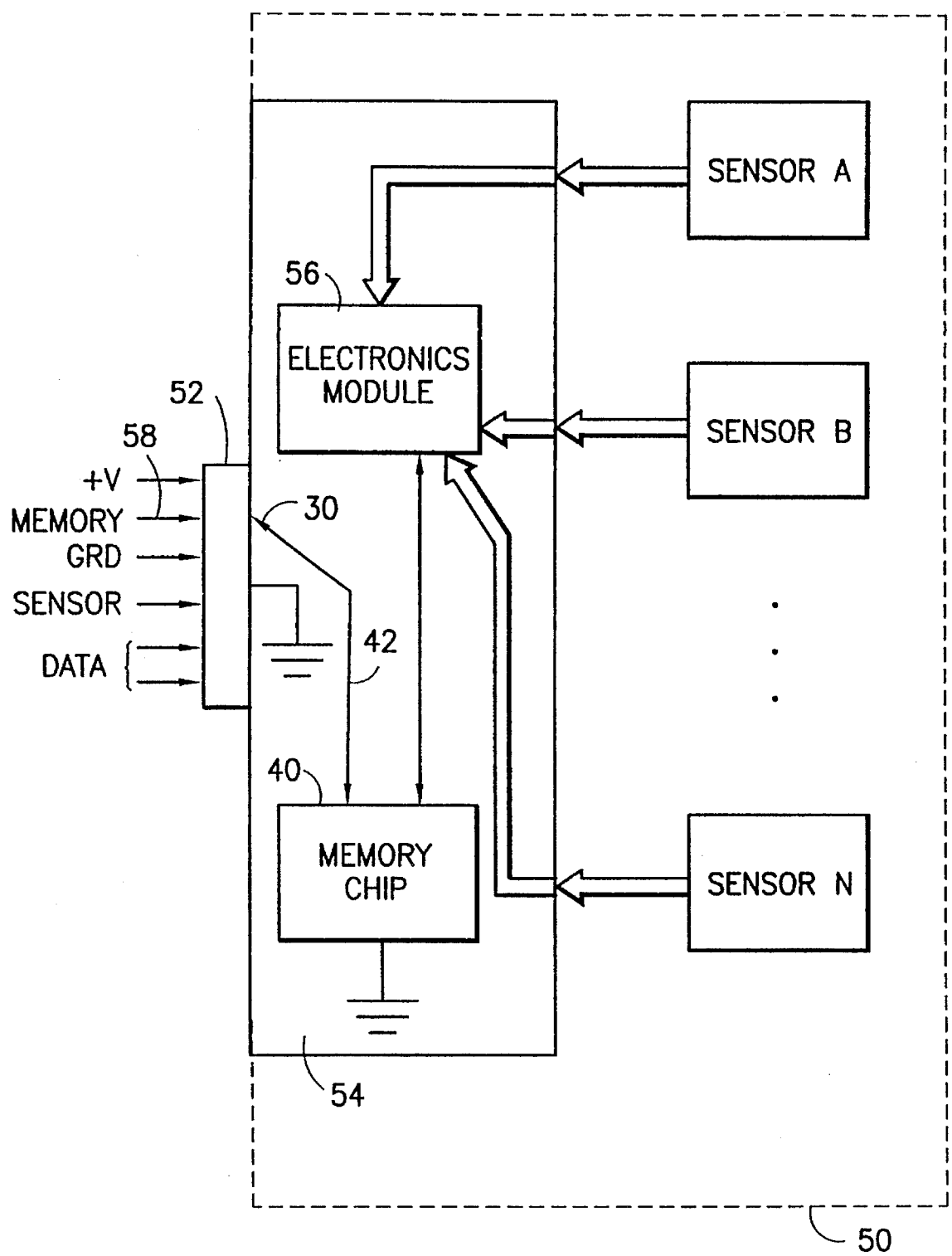
FIG. 3 illustrates further detail of an interface portion of a replaceable part, showing a one wire interconnection for an on-board serial access memory.

Referring to FIG. 2, each replaceable part/consumable mates with a receptacle 36 (shown schematically) within a printer 38. Each of the fuses shown in FIG. 1 have been replaced by a memory chip 40 which connects to the preexisting connector 30 via a wire 42 and enables storage of both usage and calibration data regarding the replaceable part. In FIG. 3, a further detailed view is shown of an interface between a replaceable part 50 and a connector 52 within a printer. Replaceable part 50 includes a plurality of sensors A-N that are interconnected with an interface board 54 on which one-wire memory chip 40 and electronics module 56 are mounted. (Most of the interconnections on board 54 are not shown to avoid an overcomplication of the view.) Sensors A-N feed signals to electronics module 56 which provides an interface function to connector 52 and the various control and sense lines that are connected thereto. Line 42 from one-wire memory chip 40 is connected via contact 32 to memory line 58 which is, in turn, connected to control computer 28 so as to enable both reading and writing actions with respect to memory chip 40.

In order to enable control computer 28 to identify the particular replaceable part, it is preferred that blocks of serial numbers be preassigned to replaceable part types. Control computer 28 is pre-loaded with appropriate data that enables identification of the particular replaceable part, simply by reading the serial number stored in memory chip 40 carried by the replaceable part.

During operation of the printer, control computer 28 is periodically activated to cause outputs from sensors A-N to be recorded so as to enable use of the sensed data in rendering system adjustments. In this regard, data from plural memory chips are correlated so as to enable more accurate adjustments than heretofore. For example, as indicated above, fuser assemblies have determined the amount of silicone oil to apply to a media sheet in dependence upon the type of media sheet being fed. Prior art systems have employed a light sensor to detect the reflectivity of the media sheet in order to alter a silicone oil deposition rate. As the silicone oil is contained in a sponge-like media, the fuser assembly rollers are slowed to achieve a greater silicone oil deposition upon selected types of media sheets. Currently, EP printers slow the user rollers by approximately 50% when overhead transparencies are fused. This slow down roughly doubles the amount of silicone oil deposited. Through the use of this invention and detailed knowledge of past silicone oil usage—as derived from data stored in a memory chip 40, the temperature of the fuser rollers can be increased to increase the silicone oil release rate to obtain a desired color saturation level—without decreasing the roller speed. Thus, with precise knowledge of past silicone oil usage history, the temperature of fuser rollers can be altered by control computer 28 to allow the fuser system to operate at full speed while the silicone oil is being deposited at the higher temperature.

In a similar manner, data can be stored in a memory chip 40 which enables more accurate control in response to developer module parameters. Presently, the only information stored by control computer 28 regarding a color developer module is a sensor offset, a page count, and a humidity value. The sensor offset is used to control the toner-to-carrier ratio. Page count is used to also modify the toner-to-carrier ratio to compensate for aging of the developer's mechanical assemblies and aging of the carrier, per se. It will be recalled that the carrier is a magnetic material used to convey toner and helps develop proper electrostatic charges on the toner particles. Memory chip 40 will preferably store additional data regarding developer module parameters that affect image production. Those parameters will include: developer magnet strength; absolute distance between the developer sleeve and the photoconducting drum; developer surface roughness and absolute magnet angle. Each of the aforesaid parameters directly affects development quality and will enable control computer 28, upon determining the aforesaid stored parameters, to more accurately compensate for variations thereof. Similarly, a memory chip 40 associated with a drum would record a parameter defining the drums' photosensitivity (i.e. charge and discharge characteristics). Control computer 28 will compensate for variations in that parameter by adjusting toner carrier ratio, laser power and bias settings for both the developer module and the drum photoconductor.

Further, carrier particles employed with the toner exhibit a charge-to-mass ratio which is a measure of the carrier's ability to impart a charge to the toner. Such charge-to-mass ratio is recorded after manufacture and a low charge-to-mass ratio means that there is less control of the tone and that it is emplaced more easily on the drum. Such charge-to-mass ratio, as measured by the manufacturer, can be stored in a memory chip 40 attached to each developer module. Upon initialization, a printer would adjust a number of settings in the printer to compensate for a charge-to-mass ratio which falls outside of an expected range (e.g., the toner-to-carrier ratio could be altered, the drum bias setting changed, the laser power setting or the developer bias setting altered etc.).

Upon receiving updated sensor data and performing the necessary calculations, control computer causes revised usage and/or calibration data to be written to the respective memory chips 40 to update their memory states. Thus, if a replaceable part from a first printer is transferred to a second printer, control computer 28 in the second printer is enabled to access the usage and calibration data of the newly substituted replaceable part and to accurately adjust its operating states in accordance therewith.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. Apparatus for making marks on media sheets, said apparatus adapted to receive replaceable parts that are subject to wear or include a consumable that is employed during operation of said apparatus, said apparatus comprising:

processor means for controlling said apparatus;

a receptacle for receiving a replaceable part;

first connector means associated with said one receptacle and coupled to said processor means; and a replaceable part, juxtaposed to said receptacle and including a second connector means that mates with said first connector means, said replaceable part including a serial access memory that is connected to said second connector means by only a single wire, said processor means enabled thereby to both read and write data from and to said serial access memory, said serial access memory storing data at least indicative of usage of said replaceable part.

2. The apparatus as recited in claim 1 wherein said processor means is controlled to periodically write updated usage data into said serial access memory so as to accurately reflect usage of said replaceable part.

3. The apparatus as recited in claim 1 wherein said serial access memory further stores calibration data for said replaceable part, said processor means controlled to access said calibration data and to combine said calibration data with other data so as to enable the generation of control signals for said apparatus.

4. The apparatus as recited in claim 1, wherein said serial access memory stores a serial number indicative of said replaceable part, said processor means including stored data which enables identification of said replaceable part upon a reading of said serial number from said serial access memory and a comparison thereof with said stored data.

5. The apparatus as recited in claim 1, wherein said serial access memory is coupled to a fuser assembly and includes data regarding past usage history of an incorporated silicone oil supply, said processor means responding to said data regarding past usage history to modify a temperature of said fuser assembly upon determining that a transparency media sheet is to pass in contact therewith.

6. The apparatus as recited in claim 1, wherein said serial access memory is coupled to a developer module and stores a parameter defining a charge-to-mass ratio of toner carrier contained within said developer module, said processing means employing said parameter to modify a setting of a further instrumentality in said apparatus to compensate for said charge-to-mass ratio parameter.

7. The apparatus as recited in claim 1, wherein said serial access memory is coupled to a developer module and stores parameters defining a developer magnet strength and a distance between a surface of said developer module and a photoconducting drum, said processing means employing said parameters to enable adjustment of further parameters within said apparatus to compensate therefor.

* * * * *